July 20, 1954  F. KELLNER  2,684,020

BELLOWS ACCESSORY FOR MIRROR REFLEX CAMERAS

Filed March 25, 1952

INVENTOR
FERDINAND KELLNER
by Walter S. Bleston
ATTORNEY

Patented July 20, 1954

2,684,020

UNITED STATES PATENT OFFICE 2,684,020

BELLOWS ACCESSORY FOR MIRROR REFLEX CAMERAS

Ferdinand Kellner, Hart, near Memmingen, Germany, assignor to Karl Muller jr. Photo-Kino-Radio, Memmingen (Bavaria), Germany, a firm Application March 25, 1952, Serial No. 278,364

Claims priority, application Germany March 31, 1951

4 Claims. (Cl. 95—42)

1

The invention relates to the design of a bellows accessory for reflex cameras with built-in or attached mirror reflex device. The known types of bellows attachments show the disadvantage of interfering with certain manipulations on the camera, especially with the handling of the releasing button and of the lens bayonet catch of the camera respective to the bellows device. Therefore an intermediate piece till now has been used to extend the distance between the front piece of the camera and the rear frame of the bellows device so that sufficient space could be obtained to handle the camera release and the bayonet catch. However this caused the bellows and the lens on it to be more distant from the film plane so that a focal length of at least 150 mm. was required for focusing infinity. The focusing range of a similar focal length however did not permit close-ups up to the limit of the focusing range of the normal lens (e. g. 50 mm. lens for miniature cameras) used with the bellows device. There was consequently a blank in the focusing range that could not be covered but by means of a third focal length. But a third lens, of course, means a handicap to the cameraman.

It is the object of the present invention to avoid these drawbacks by its specially adapted design. A further object of the invention is to improve and to simplify the manipulation of the bellows accessory and to combine same with a macro-focusing device.

The accompanying drawing shows by way of example a realisation of the invention.

Figure 1:
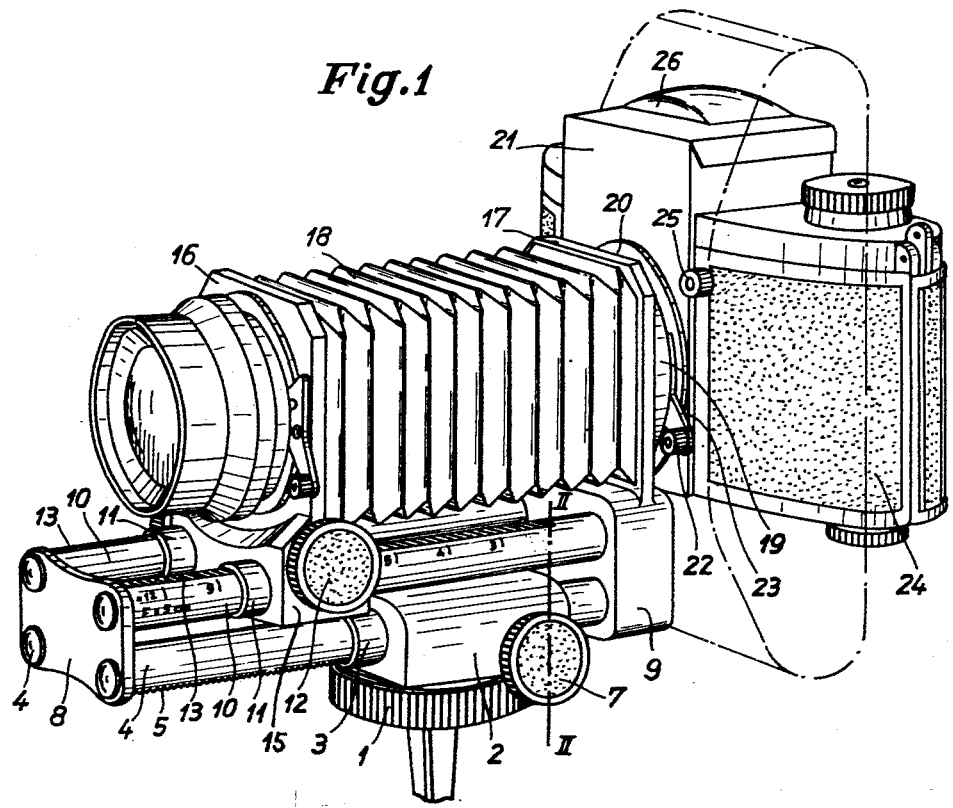
Fig. 1 is a perspective view of a mirror reflex camera of well-known design provided with a bellows accessory partially extended and mounted on a tripod.
Figure 2:
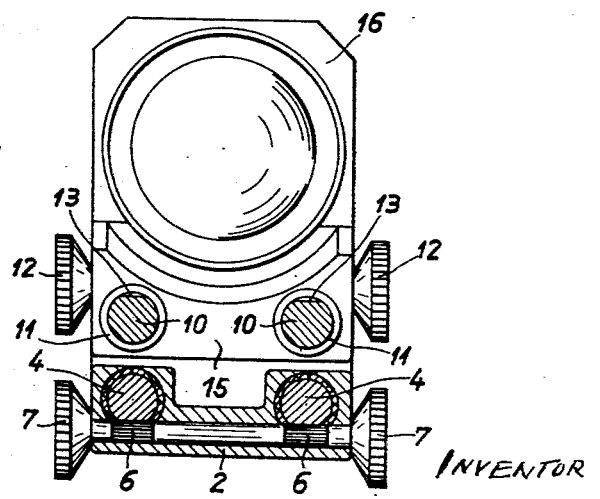
Fig. 2 is a vertical section through plane II—II of Fig. 1, but with the bellows completely compressed so that the section is executed in front of the bellows front frame.

The head 1 of a tripod of any design is screwed to a sliding part 2 provided with two gangholes 3 through which are guided two rails 4 geared on bottom 5 to permit movement of sliding part 2 by means of toothed axle 6 which is provided with milled buttons 7. Both ends of the two rails 4 are mounted into front piece 8 and rear piece 9 forming a connection to a second pair of geared rails 10 guided through two gangholes 11 in a second sliding part 15. Movement of the sliding part 15 is also effected by means of rack-and-pinion adjustment provided by gear 13 on rails 10 and toothed axle 14 with milled buttons

2

15. The sliding part 15 carries bellows front frame 16. Rear piece 9 carries bellows rear frame 17, designed to form stationary connection to camera 24. The bellows 18 is attached to these frames 16 and 17 in the usual way.

The back of the rear frame 17 is provided with the usual annular projection 19 which freely connects the camera opening 20 that usually accepts the lens and is installed on the front piece 21 of the camera 24 so that the camera is freely swingable through 90° from horizontal position shown in Fig. 1 to vertical position marked with strokes in Fig. 1. A catch 23 with handle 22 arranged in front of the camera opening 20 ensures security of attachment of camera 24 to frame 17. The releasing button 25 of camera 24 is situated as usually close to the border of the front piece 21 which accepts the lens and behind of which the mirror reflex device 26 is installed in the usual manner. A specification of the camera is omitted as unessential.

Contrary to the known types of bellows devices, height and breadth of the bellows 18 which shows an almost quadratic cross section, as well as breadth of the frames 16 and 17 nearly correspond to breadth of front piece 21 so that the releasing button 25 usually installed close to same can be actuated. The handle 22 of the catch 23 also can be reached without any inconvenience, so that an intermediate piece between camera and bellows accessory can be avoided.

What I claim is:

1. A bellows front attachment for a small picture, mirror reflex camera comprising a bellows including a front and a rear frame, said rear frame being so formed that said camera may be releasably attached thereto, a front end piece and a rear end piece, said rear end piece being connected to said rear frame, a lower and an upper pair of guide rods secured with their ends in said end pieces in parallel relationship to each other, a slide connected with said front frame and guided on said upper pair of rods, a support including means to secure said support releasably to a standard, said lower pair of rods being moveable lengthwise in said support, means to shift said side lengthwise of said upper rods, and means to shift said pair of lower rods in relation to said support.

2. A device as claimed in claim 1, said front frame being integral with said slide, said rear frame being integral with said rear end piece and including means for attaching said camera to said rear frame cantilever-like and freely turnable from the upright to the transverse position.

3. A device as claimed in claim 1, said rods including racks, first pinions in engagement with the racks of said upper pair of rods and journaled in said slide, second pinions in engagement with the racks of said lower pair of rods and journaled in said support, and buttons connected to said pinions for turning the latter.

4. A device as claimed in claim 1, further comprising on said upper guide rods markings indicative of the exposing factors in relation to the draw of the bellows.

References Cited in the file of this patent

UNITED STATES PATENTS

| Number | Name | Date |
|---|---|---|
| 2,351,753 | Flint et al. | June 20, 1944 |

FOREIGN PATENTS

| Number | Country | Date |
|---|---|---|
| 782,058 | France | Mar. 11, 1935 |
| 927,991 | France | May 19, 1947 |